United States Patent [19]
Rainey

[11] 3,970,216
[45] July 20, 1976

[54] COIN CONTROLLED VENDING APPARATUS

[76] Inventor: Don E. Rainey, 456 S. Dixie Highway, East Pompano Beach, Fla. 33060

[22] Filed: Sept. 9, 1974

[21] Appl. No.: 504,158

Related U.S. Application Data

[60] Continuation of Ser. No. 188,543, Oct. 12, 1971, abandoned, which is a division of Ser. No. 816,276, April 15, 1969, Pat. No. 3,702,655.

[52] U.S. Cl................................ 221/125; 221/131; 221/295; 221/278
[51] Int. Cl.².......................................... B65G 59/00
[58] Field of Search ............ 221/258, 268, 295, 125, 221/29, 278, 131, 289; 194/2

[56] References Cited
UNITED STATES PATENTS

| 2,053,828 | 9/1936 | Harper | 221/295 X |
| 3,164,296 | 1/1965 | Barnhart | 221/258 X |
| 3,432,076 | 3/1969 | Arsenault | 221/295 |
| 3,570,711 | 3/1971 | Young, Jr. | 221/295 |

*Primary Examiner*—Allen N. Knowles
*Attorney, Agent, or Firm*—Bacon & Thomas

[57] ABSTRACT

Coin controlled article vending apparatus which features a hydraulic system to release a selected article from stacked horizontal position for dispensing.

8 Claims, 5 Drawing Figures

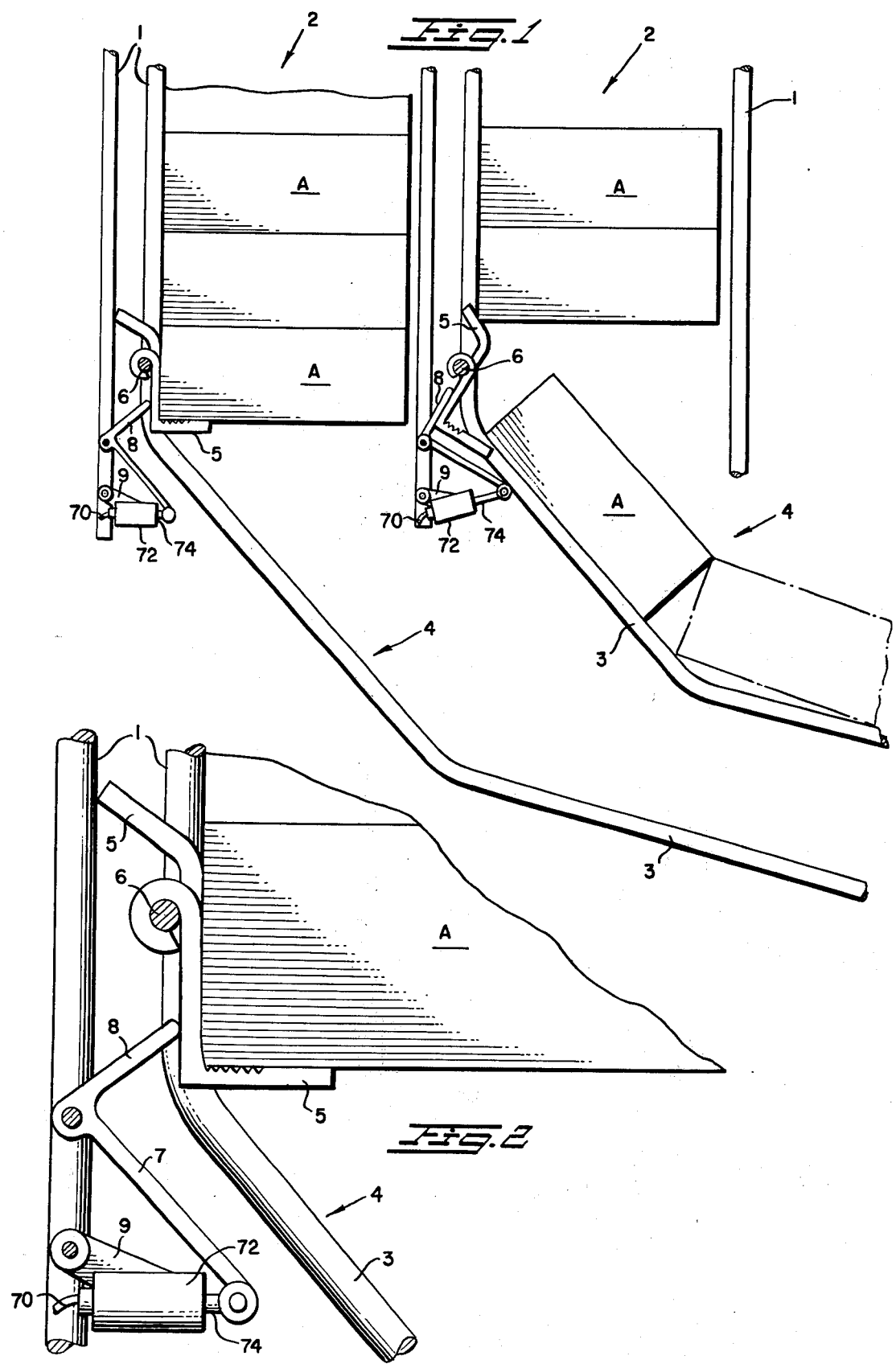

COIN CONTROLLED VENDING APPARATUS

This is a continuation of application Ser. No. 188,543, filed Oct. 12, 1971, now abandoned which in turn is a division of application Ser. No. 816,276 filed Apr. 15, 1969 now U.S. Pat. No. 3,702,655.

The present invention relates to improvements in coin controlled vending apparatus and is concerned more particularly with the use of a hydraulic system in combination with such apparatus to release articles from stacked horizontal position in a vertically arranged chute to discharge position from the apparatus.

The invention is specifically concerned with improvements in my copending application Ser. No. 765,936, filed Oct. 8, 1968 now U.S. Pat. No. 3,502,382, entitled, "Dispensing Apparatus Mechanism", which is a continuation-in-part of my application Ser. No. 614,768, filed Jan. 18, 1967, now U.S. Pat. No. 3,433,545, such improvements involving a hydraulic selector system to adapt the apparatus of the foregoing patent and application specifically to coin controlled article dispensing operation.

Another object of the invention is to provide a hydraulic system having a plurality of connected push buttons and plungers for controlling the release of a selected article so constructed and arranged that only a single push button and plunger can be actuated at any one time. A further object is to provide such a system which is rendered inoperative if attempt is made simultaneously to actuate two or more push buttons and plungers.

Other objects and advantages will be apparent from the followng detaled description taken in conjunction with the accompanying drawings wherein a preferred embodiment of the principles of the invention has been selected for exemplification.

In the drawings:

FIG. 1 is an enlarged partial detailed view, similar to FIG. 1 of my aforesaid patent application, showing articles stacked in vertical chutes and transposer means pivotally supported at the lower ends of each chute to shift the lowermost articles from horizontal position to releasing dispensing position in a downwardly inclined trackway;

FIG. 2 is a still further enlarged view of a portion of FIG. 1 showing the transposer means in locked position and the hydraulically actuated escapement mechanism as contemplated by the present invention in cooperation therewith;

Figure 3:
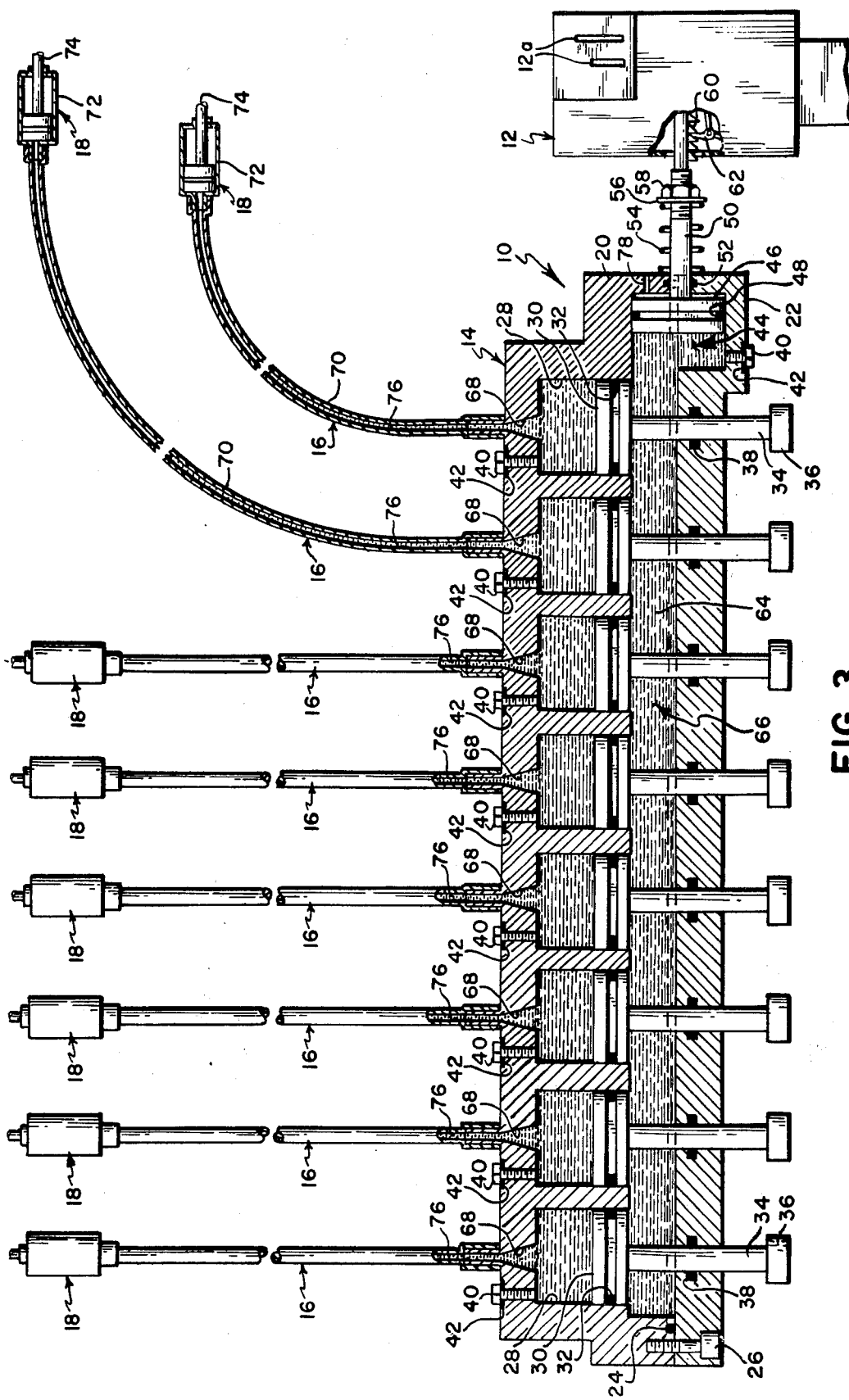
FIG. 3 is a detailed sectional view of a coin operated hydraulic means for operating the locking or escapement mechanisms shown in FIGS. 1 and 2.

Referring more particularly to the drawings, wherein like numerals refer to like parts, the upright frame elements 1 in FIGS. 1 and 2 define vertically arranged chutes indicated in their entireties at 2. Frame elements 3 define downwardly inclined dispensing trackways indicated in their entireties at 4. It is to be understood, however, that the chutes 1 and dispensing trackways 4 may be formed in any other manner, provided in any desired number and that the trackways 4 may extend downwardly at any angle or even dispensed with altogether.

The articles stored and to be dispensed are designated at A.

In the particular form of the invention shown in FIGS. 1 and 2, transposer means for shifting the lowermost article in the chutes form horizontal position to released dispensing position comprises a substantially L-shaped element 5 pivotally supported at the lower end portions of each of the vertical chutes 2 in any suitable manner such as by a rearwardly extending shank or hinge in rotatable engagement with a crossbar 6. The transposer element 5 is shown in locked article engaging position at the left-hand chute in FIG. 1 and in FIG. 2, and in article releasing position at the right-hand chute in FIG. 1.

For actuating the transposer means or L-shaped element 5, a rocker arm 7 is pivotally supported by a shaft carried by uprights 1 rearwardly of each of the transposers 5 and has a free upper end portion 8 in sliding engagement with the rearward upright wall portion of the transposer 5, as shown, and its lower end portion connected to hydraulic cylinder and piston means 70, 72 and 74 to be later described. A bracket 9 or the like supports the hydraulic means in operative position upon an upright 1.

Figure 4:
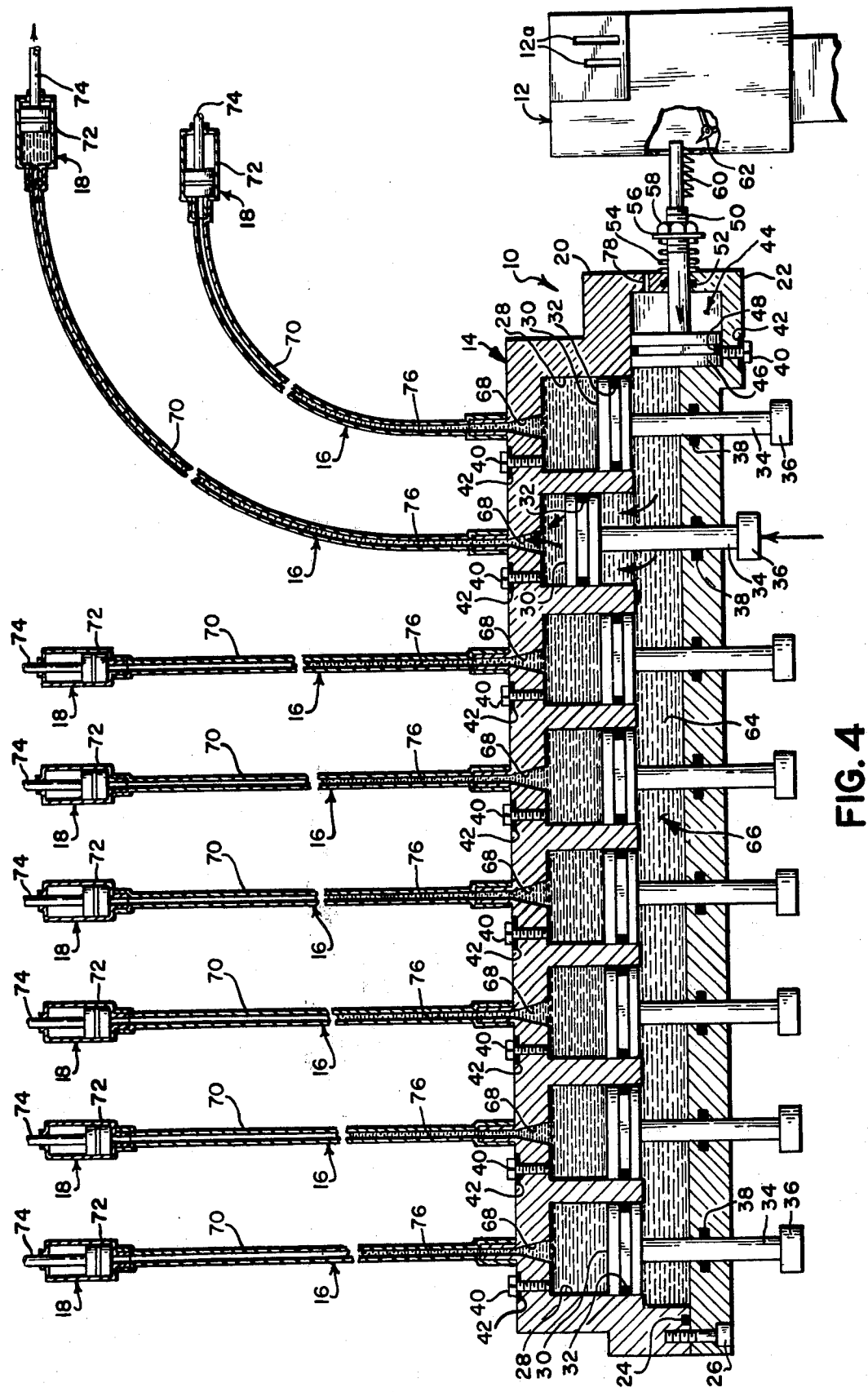
FIG. 4 is a view similar to FIG. 3 but showing one of the push buttons and plungers in actuating position.
Figure 5:
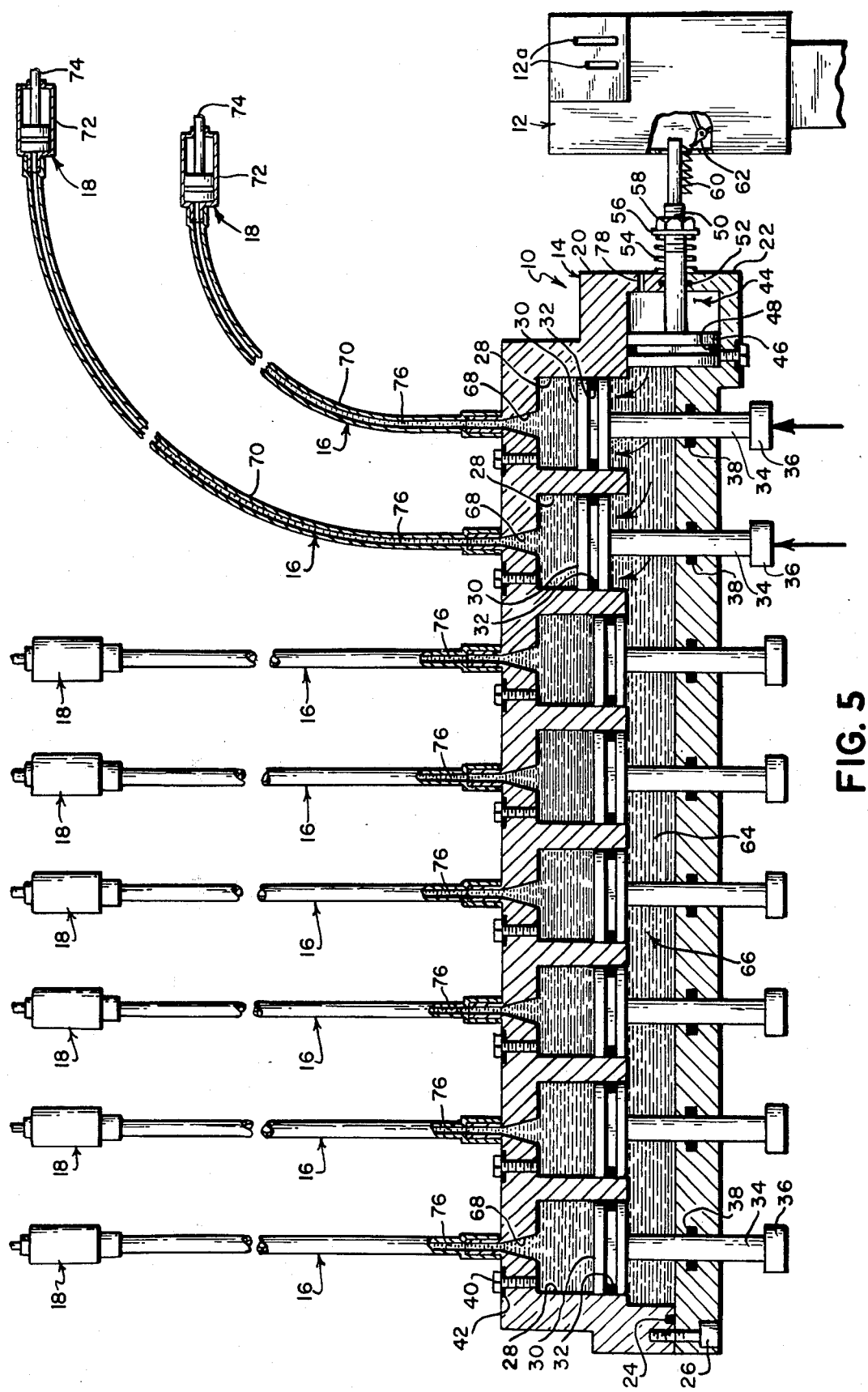
FIG. 5 is a view similar to FIGS. 3 and 4 but showing the safety feature wherein two push buttons and plungers cannot be operated simultaneously because of the limited volume of hydraulic fluid.

Referring now to FIGS. 3, 4 and 5, there is shown a liquid containing housing indicated in its entirety at 10 and an associated control box indicated in its entirety at 12 and including coin slots 12a. The coin control device 12 may be of any conventional kind and accordingly is not shown in full detail. The rear wall portion 14 of the housing 10 has a plurality of flexible conduits 16 for conveying fluid to terminal cylinder and piston means indicated in their entireties at 18. The fluid contained in the housing 10 and its connecting conduits may be termed a secondary fluid body. Projecting end walls 20 and 22 of the housing 10 form a reservoir cylinder for a primary fluid body as will be hreinafter described.

The front and rear wall sections of the housing 10 are preferably provided with interposed sealing washers 24 and are connected by bolts 26. The rear wall section 14 is formed to provide a plurality of cylinders 28 for receiving plungers 30 and sealing rings 32. The plungers 30 have shafts 34 which project outwardly of the front wall section of the housing 10 and terminate in push buttons 36 for selective manual operation of the plungers. The shafts 34 are sealed by rings 38. Removable screws 40 having washers 42 provide access to the interior of each of the cylinders 28 and to the end reservoir cylinder 44.

The piston or plunger 46 including a sealing ring 48 is reciprocable in the reservoir cylinder 44 on a shaft 50 sealed by a ring 52 and projecting outwardly of the end of the housing 10 adjacent to the coin control 12. The shaft is spring pressed intermediate its length by a spiral spring 54 the tension of which may be adjusted by the disc 56 and nut 58. The free end portion of the shaft 50 is provided with ratchet teeth 60 which are projectable into the coin box 12 for engagement with locking dog means 62 operable by the coin control device. FIG. 3 shows the dog rack 60 and 62 in locked inoperable engagement and FIGS. 4 and 5 show them disengaged for release of the piston 46 to allow fluid to flow out of the reservoir 44 under the influence of plungers 30 when manually actuated. A bleeder port 78 in the end wall of the reservoir 44 allows for ready reciprocal movement of the piston 46.

The reservoir indicated in its entirety at 66 is in open communication with the end reservoir cylinder 44 and is the receptacle for the primary body of fluid 64. When the fluid 64 fills the reservoir 44, and piston 46 is locked in the position shown in FIG. 3, the plungers 30 are locked against forward thrust by virtue of the unexpansible nature of fluid 64 and the apparatus is inoperable. However, when the coin control 12 releases the piston 46, any selected plunger 30 becomes operable to withdraw the volume of fluid 64 from the reservoir 44 into the primary reservoir 66 upon forward thrust of the plunger 30 to actuate the hydraulic terminal means 18 for pivotally shifting the transposer 5 to release an article A from chute 1.

It will be apparent that the volume of fluid in the reservoir 44 is so limited that when it is withdrawn into the primary or main fluid system upon release of the dog rack 60 and 62 only a single plunger 30 may be operated to dispense an article as shown in FIG. 4 and that, when such volume is returned to the reservoir, none of the plungers is capable of dispensing operation, as shown in FIG. 3. Also as shown in FIG. 5, the volume of fluid is such that a plurality of plungers 30 cannot be simultaneously operated, thus restricting the dispensing function to a single selected article.

The conical ports 68 facilitate the plunger 30 forced entry of fluid 76 into the extended conduits 70 and to the article releasing terminal means 18 where the cylinder 72 and reciprocating piston 74 actuate the rocker arm 7 or other equivalent means in turn to actuate the transposer 5 for dispensing release of a selected article as shown in FIGS. 1 and 2.

It is to be understood that the present invention is not confined to the precise construction and arrangement of parts as herein illustrated and described but embraces all such modifications thereof as may come within the scope of the invention.

I claim:
1. Vending apparatus for storing and dispensing articles which comprises:
   i. a cabinet having a multiplicity of vertically arranged chutes for receiving the articles in stacked horizontal position;
   ii. Transposer means pivotally supported at the lower ends of each chute to shift the lowermost articles in the chutes from horizontal position to downward discharge dispensing position; and,
   iii. an hydraulic control system to activate said transposer means, said hydraulic control system comprising:
      a. a primary fluid body;
      b. a secondary fluid body;
      c. cylinder and reciprocating plunger means interposed between said bodies;
      d. means actuated by said secondary fluid; and,
      e. fluid limiting means for selectively limiting the volume of fluid available to said primary fluid body comprising a cylinder cooperating with said primary fluid body, and a cooperating piston reciprocable between retracted and extended positions within said cylinder and defining the volume limits of fluid available to said primary fluid body; whereby, said plunger means is operable in accordance with the available volume of fluid.

2. The control system of claim 1, wherein said fluid limiting means further comprises lock means for selectively locking said piston in said retracted position to thereby prevent operation of said plunger means by precluding the admission of additional fluid to said primary fluid body.

3. The control system of claim 2, wherein said secondary fluid actuated means comprises a plurality of fluid actuated means and wherein said cylinder and reciprocating plunger means comprises a plurality of cylinders and reciprocating plungers interposed between said primary fluid body and wherein the volume of fluid withdrawn from said primary fluid system by movement of a single one of said plurality of plungers is substantially equal to the volume of fluid available to said primary fluid body from said fluid limiting means upon release of said lock means, whereby only a single plunger may be actuated at any one time.

4. The control system of claim 2, wherein said lock means includes means biasing said piston to said retracted position.

5. The control system of claim 2, wherein said lock means engages and locks said piston in response to movement of the same to said retracted position.

6. The control system of claim 2, wherein said lock means is coin responsive for release of said piston.

7. The control system of claim 1, including a fluid tight housing having a first compartment containing said primary fluid body, a second compartment divided into a plurality of individual fluid cylinders containing said secondary fluid body, and a third compartment housing said fluid limiting means.

8. The control system of claim 7, wherein said housing is elongated and said plurality of individual cylinders are disposed adjacent each other along the length of said housing, each of said cylinders cooperating with a secondary fluid actuated device and a plunger assembly, each of said plunger assemblies extending through said first compartment and exteriorly of said housing to enable manual actuation thereof.

* * * * *